(12) United States Patent
Haun et al.

(10) Patent No.: US 6,908,869 B2
(45) Date of Patent: Jun. 21, 2005

(54) OUTDOOR STRUCTURE WITH STRETCHABLE BLENDED WOVEN FABRIC

(75) Inventors: Steve Haun, Cottondale, AL (US); Reese Brooks, Tuscaloosa, AL (US)

(73) Assignee: Phifer Wire Products, Inc., Tuscaloosa, AL (US)

( * ) Notice: Subject to any disclaimer, the term of this patent is extended or adjusted under 35 U.S.C. 154(b) by 224 days.

(21) Appl. No.: 10/327,100

(22) Filed: Dec. 24, 2002

(65) Prior Publication Data
US 2004/0121684 A1 Jun. 24, 2004

(51) Int. Cl.[7] .......... D03D 15/00; D03D 15/08; A47C 7/02
(52) U.S. Cl. .......... 442/189; 442/197; 442/208; 442/209; 442/213; 442/216; 442/218; 442/220; 139/420 R; 139/421; 297/452.12; 297/452.13
(58) Field of Search .......... 442/189, 197, 442/208, 209, 213, 216, 218, 220; 139/420 R, 421; 297/452.12, 452.13

(56) References Cited

U.S. PATENT DOCUMENTS

| | | | |
|---|---|---|---|
| 4,587,997 A | 5/1986 | Brooks | |
| 4,996,100 A | 2/1991 | Druckman | |
| 5,063,876 A | 11/1991 | Harris | |
| 5,807,794 A | 9/1998 | Knox et al. | |
| 5,899,783 A | 5/1999 | Kimbrell, Jr. et al. | |
| 5,985,961 A * | 11/1999 | Dailey et al. | 524/100 |
| 6,017,586 A | 1/2000 | Payn et al. | |
| 6,345,428 B2 | 2/2002 | Apissomian | |
| 6,369,178 B1 | 4/2002 | McCarthy | |
| 6,575,492 B2 * | 6/2003 | Davidson | 280/647 |
| 2003/0192124 A1 * | 10/2003 | Setzer | 5/655.7 |

* cited by examiner

Primary Examiner—Cheryl A. Juska
Assistant Examiner—Jenna-Leigh Befumo
(74) Attorney, Agent, or Firm—Arent Fox PLLC

(57) ABSTRACT

A woven fabric structure for outdoor furniture use is provided. The woven fabric structure is a blended fabric containing a coated multifilament yarn and an elastomeric yarn that is resistant to water, ultraviolet, heat degradation or other significant outdoor exposure. The elastomeric yarn is provided in the fill direction and the coated multifilament yarn is provided in the warp direction. Additionally, the coated multifilament yarn can be combined with a yarn such as spun acrylic, polyester, nylon yarn, texturized filament yarns; or other uncoated filament yarns.

72 Claims, 3 Drawing Sheets

US 6,908,869 B2

OUTDOOR STRUCTURE WITH STRETCHABLE BLENDED WOVEN FABRIC

FIELD OF THE INVENTION

This invention relates generally to the art of fabrics. More particularly, the present invention relates to a fabric suitable for outside exposure to the environment or elements when used in outdoor furniture.

BACKGROUND OF THE INVENTION

Stretchable fabrics are known for indoor furniture use. However, these known fabrics are knitted and generally are not suited for use outdoors. Additionally, it is known to use vinyl coated yarn in a fabric for indoor furniture use.

For example, U.S. Pat. No. 5,807,794 to Knox et al. discloses a reinforced knitted fabric incorporating elastomeric yarn laid through a knit base in the warp direction and a weft insertion yarn laid through the knit base. The fabric structure is a two bar warp knit, weft insertion product having elastomeric yarns disposed in the warp direction, and spun or textured polyester yarn inserted in the weft direction. These yarns are held together at their cross-over points by a surrounding knit matrix formed by knit yarns resulting in the reinforced knit fabric.

U.S. Pat. No. 5,063,876 to Harris discloses an animal training pen having a rope-around section of woven, net-like panels made of PVC or vinyl coated elastic and polyester yarn.

However, prior to the present invention, the use of a stretchable or coated elastomeric yarn, combined with a vinyl coated multifilament core yarn in a woven fabric for use with outdoor furniture has not been known.

SUMMARY OF THE INVENTION

It is thus an object of the present invention to provide a woven fabric suitable for use with outdoor furniture.

It is a further object of the present invention, to provide a woven fabric that is stretchable and suitable for use with outdoor furniture.

The woven fabric provides a high degree of comfort and flexibility, and exhibits substantial resistance to degradation due to water and ultraviolet radiation.

The present invention provides a furniture structure for outdoor use. The furniture includes a frame having a top portion, bottom portion, left portion and right portion. A woven fabric is attached on the left portion and right portion of the frame. The woven fabric includes an elastomeric yarn in the fill direction and a coated multifilament yarn in the warp direction.

BRIEF DESCRIPTION OF THE DRAWINGS

This invention will be described in detail with reference to the accompanying drawings.

DETAILED DESCRIPTION OF THE INVENTION

Figure 1:
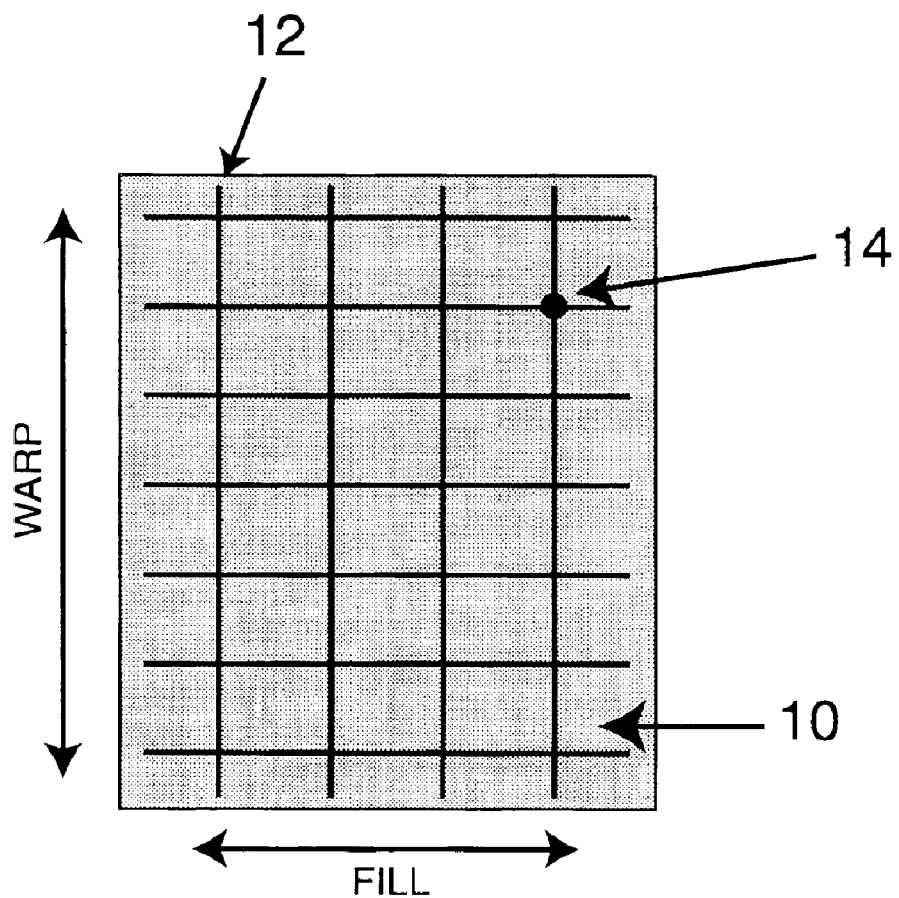
FIG. 1 is an enlarged view of a fabric for use with outdoor furniture, in accordance with the present invention.

The following description describes various aspects of the present invention as illustrated in the drawings. As shown in FIG. 1, in a preferred embodiment, the woven fabric for use in the present invention consists of strands of yarn 10 in the fill or weft direction of weaving and strands of yarn 12 in the warp direction of weaving. As shown in FIG. 1, the warp direction is up and down, and the fill or weft direction is left to right. Although it is preferred that the stretchable or elastomeric yarn be used in the fill or weft direction, it is also capable of being used in the warp direction.

Figure 1A:
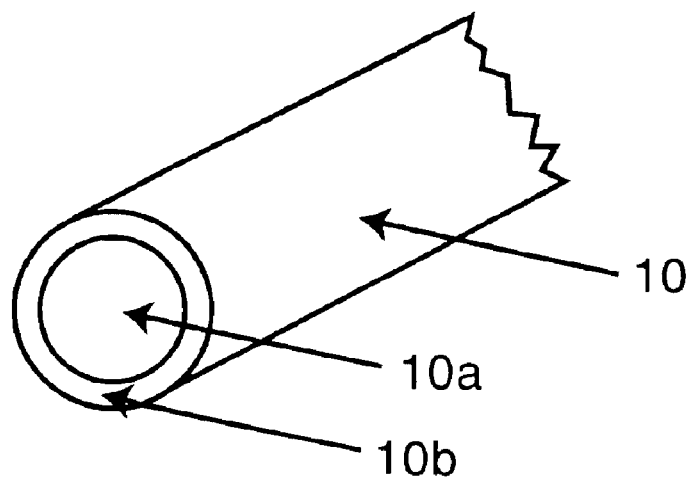
FIG. 1A is a cross-sectional view of the stretchable or elastomeric yarn in accordance with the present invention.

The yarn 10 used in the fill direction or the weft direction is a stretchable or elastomeric yarn. In a preferred embodiment, the yarn 10 is comprised of co-extruded thermoplastic elastomers, such as copolyesters, with an inner core 10a and outer sheath 10b, as shown in FIG. 1A. The inner core 10a typically is of a higher molecular weight to provide the desired strength and elongation properties, and the outer sheath 10b is of a lower molecular weight to facilitate thermal bonding of the fill yarns to the warp yarns. The elastomeric or stretchable fill yarn 10 typically ranges in diameter from about 0.018 to 0.030 inches, but other diameters may be used as well. The elastomeric or stretchable yarn 10 may be coated and includes UV and heat stabilizers, and is resistant to water and ultraviolet (UV) degradation or other significant outdoor exposure.

Figure 1B:
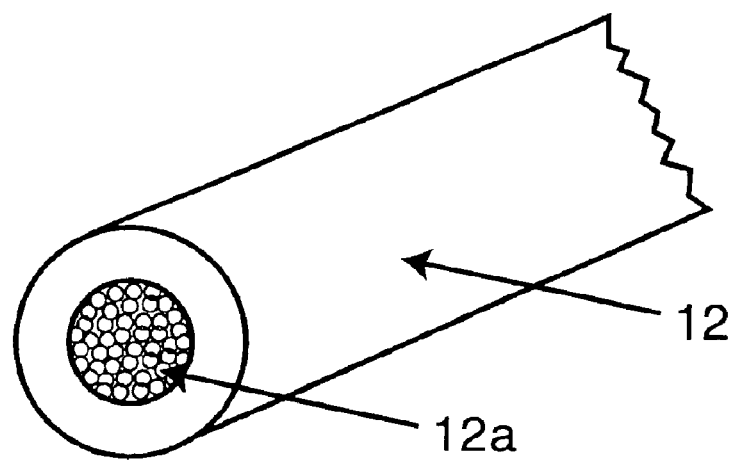
FIG. 1B is an enlarged view of the vinyl coated multifilament core yarn in accordance with the present invention.

The yarn 12 used in the warp direction preferably is a coated multifilament yarn, either solely or in a blended combination with other yarns. As shown in FIG. 1B, the coated multifilament yarn typically has a polyester core 12a, but other fibers may be used as well. Typically, the coated multifilament yarn is about 500 to 1000 denier polyester coated with vinyl to a diameter from about 0.018 to 0.030 inches resulting in a vinyl content of about 50% to 85%. The vinyl coating typically is a flexible compound consisting of polyvinyl chloride resin, plasticizers, pigments, and other additives to provide heat and UV resistance.

Other yarns can also be combined with the coated multifilament yarn to provide a unique texture when woven into a fabric. The other yarns include, but are not limited to: spun acrylic, polyester, nylon yarn, texturized filament yarns such as polyester or nylon or other uncoated filament yarns. These yarns typically include 18/2 acrylic and 600 denier texturized polyester. However, other deniers and fibers may be selected to achieve desired fabric weight and durability characteristics, and are well known to those skilled in art of fabric design.

As shown in FIG. 1, the strands of yarn 10 are arranged over the strands of the yarn 12 in an alternating interlocking relationship using a weaving machine, knitting machine, warp knit weft insertion process, or any similar technique. The warp and fill yarns are thermally bonded at the cross-over points 14 by passing through a heated oven using a device such as a tenter frame. This bonding process provides the dimensional stability of the fabric construction necessary for structures such as sling structure applications. The fabric is woven such that the yarn spacing of the warp ends range from about 14 to 50 ends per inch and the fill yarn spacing ranges from about 8 to 20 ends per inch. These spacings provide strength and openness. In a preferred embodiment the stretchable woven fabric of the present invention includes the coated multifilament yarn in the warp direction containing 25 ends per inch of 0.018 to 0.025 inch diameter vinyl-coated 500 to 1000 denier polyester yarn, and 14 ends per inch of 0.022 inch diameter co-extruded elastomeric yarn. In another preferred embodiment, the stretchable woven fabric of the present invention includes in the warp direction, yarn containing alternating 18/2 acrylic and 0.018 inch diameter coated polyester yarns at a spacing of 42 ends per inch, woven with 14 ends per inch of 0.022 inch diameter co-extruded elastomeric yarn in the fill direction. The weave pattern can be, but is not limited to, any of the following weave patterns: plain, leno, mock leno, satin weave, twill, and basket weave.

Figure 2:
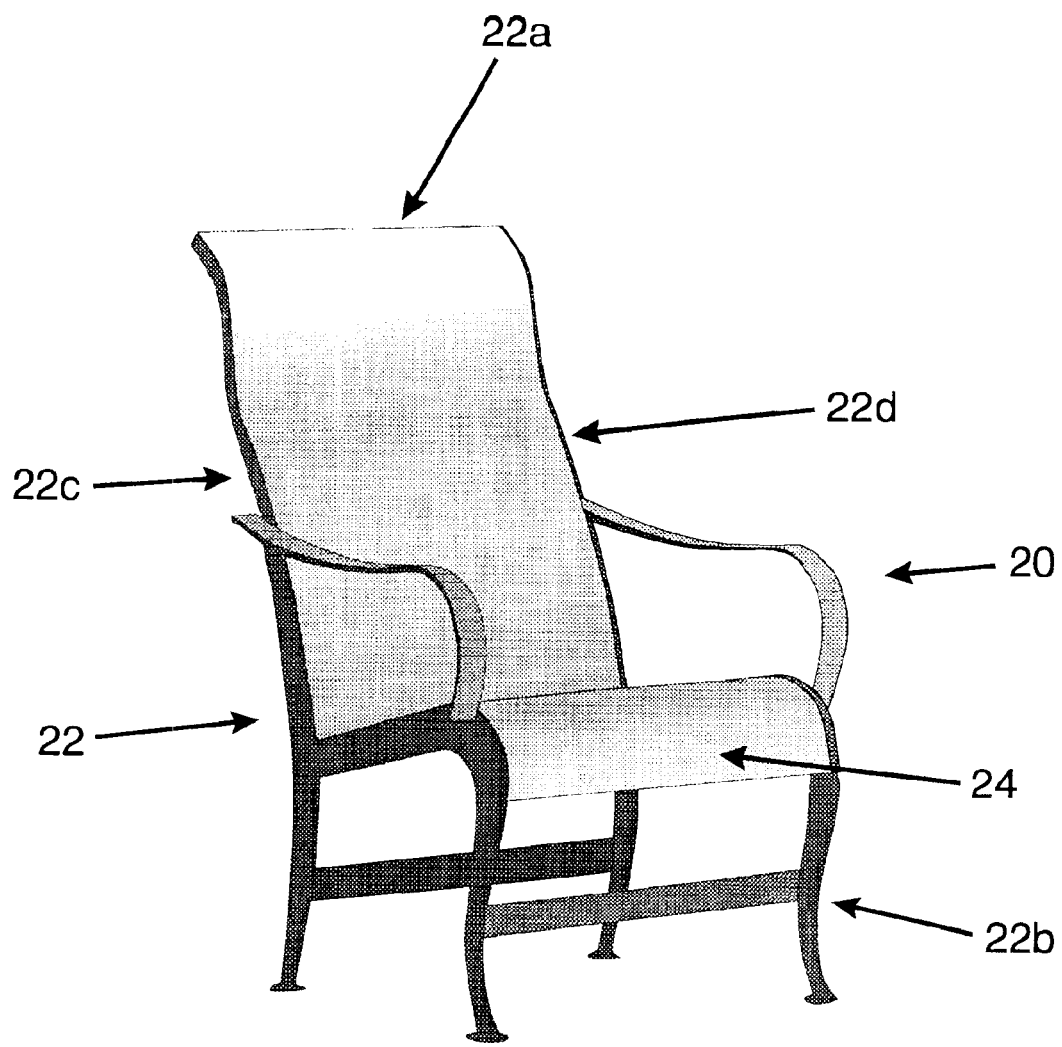
FIG. 2 is an example of the fabric of FIG. 1 used with outdoor furniture.

Shown in FIG. 2, is an example of an outdoor use for the stretchable blended woven fabric of the present invention. Preferably, a piece of outdoor furniture 20 is shown comprising a frame 22 having a top portion 22a, a bottom portion 22b, a left portion 22c, a right portion 22d and fabric 24. The fabric 24 is fitted to the left and right portions 22c, 22d of frame 22 by any known attachment mode, such as by spline and groove, staples, adhesive, or the like. The stretchable blended woven fabric 24 is attached to the frame with the elastomeric yarn positioned laterally to the frame 22. The frame 22 is constructed of any known material, such as aluminum, steel or plastic. The stretchable blended woven fabric can also be attached to the top portion 22a and the bottom portion 22b, as in a beach chair (not shown). In this arrangement, the stretchable blended woven fabric would be "railroaded" or "turned" so that the elastomeric or stretchable fill or weft yarn would run from the top to the bottom of the chair instead of from side to side.

The actual design of the outdoor furniture may vary. Additionally, the fabric use is not limited to seating structures.

Although various embodiments have been discussed, it is to be understood that while certain forms of the present invention have been illustrated, the invention is not to be limited to the specific forms or arrangements described or shown. Given the above disclosure, many other features, modifications and improvements will become apparent to one skilled in the art.

We claim:

1. A structure for outdoor use comprising:
   a frame having a top portion, a bottom portion, a left portion and a right portion;
   a woven fabric attached on the left portion and right portion of the frame;
   wherein the woven fabric includes an elastomeric yarn in the fill direction and a blend of a coated multifilament yarn combined with another yarn in the warp direction.

2. The structure of claim 1, wherein the coated multifilament yarn has a polyester core.

3. The structure of claim 2, wherein the coated multifilament yarn is 500 to 1000 denier polyester coated with vinyl to a diameter of between 0.018 to about 0.030 inches.

4. The structure of claim 3, wherein the coated multifilament yarn has a vinyl content of between 50% to about 85%.

5. The structure of claim 1, wherein the coated multifilament yarn is combined with a yarn of at least one of acrylic, polyester and nylon.

6. The structure of claim 1, wherein the coated multifilament yarn is combined with 18/2 acrylic or 600 denier texturized polyester yarn.

7. The structure of claim 1, wherein the elastomeric yarn is a co-extruded thermoplastic elastomer with an inner core and an outer sheath.

8. The structure of claim 7, wherein the inner core is of a higher molecular weight than the outer sheath.

9. The structure of claim 1, wherein the elastomeric yarn is a copolyester.

10. The structure of claim 1, wherein the elastomeric yarn has a diameter of about 0.018 to 0.030 inches.

11. The structure of claim 1, wherein the fill direction yarn spacing is between 8 to about 20 ends per inch and the warp direction yarn spacing is between 14 to about 50 ends per inch.

12. The structure of claim 1, wherein the fill direction yarn contains elastomeric yarn of 14 ends per inch of 0.022 inch co-extruded elastomeric yarn and the coated multifilament yarn contains 25 ends per inch of 0.018 to 0.025 inch diameter coated 500 to 1000 denier polyester yarn.

13. The structure of claim 1, wherein strands of the yarn in the fill direction are arranged over strands of the yarn in the warp direction in an alternating interlocking relationship.

14. The structure of claim 1, wherein the yarn in the fill direction and the yarn in the warp direction are bonded at the cross-over points.

15. The structure of claim 1, the woven fabric is at one of plain, leno, mock leno, satin weave, twill, and basket weave patterns.

16. The structure of claim 1, wherein the woven fabric includes an elastomeric yarn in the warp direction and a vinyl coated multifilament yarn in the fill direction.

17. The structure of claim 1, wherein the woven fabric is attached to the frame such that the elastomeric yarn is positioned longitudinally.

18. The structure of claim 1, wherein the woven fabric is attached to the frame such that the elastomeric yarn is positioned laterally.

19. The structure of claim 1, wherein the elastomeric yarn has an outer sheath of co-extruded yarn containing UV and heat stabilizers.

20. A piece of outdoor furniture comprising:
    a frame having a top portion, a bottom portion, a left portion and a right portion;
    a woven fabric attached on the left portion and right portion of the frame;
    wherein the woven fabric includes an elastomeric yarn in the fill direction and a blend of a vinyl coated multifilament core yarn combined with another yarn in the warp direction.

21. The piece of outdoor furniture of claim 20, wherein the vinyl coated multifilament yarn has a polyester core.

22. The piece of outdoor furniture of claim 21, wherein the vinyl coated multifilament yarn is 500 to 1000 denier polyester coated with vinyl to a diameter of between 0.018 to about 0.030 inches.

23. The piece of outdoor furniture of claim 22, wherein the vinyl coated multifilament yarn has a vinyl content of between 50% to about 85%.

24. The piece of outdoor furniture of claim 20, wherein the vinyl coated multifilament yarn is combined with a yarn of at least one of acrylic, polyester and nylon.

25. The piece of outdoor furniture of claim 20, wherein the vinyl coated multifilament yarn is combined with 18/2 acrylic or 600 denier texturized polyester yarn.

26. The piece of outdoor furniture of claim 20, wherein the elastomeric yarn is a co-extruded thermoplastic elastomer with an inner core and an outer sheath.

27. The piece of outdoor furniture of claim 26, wherein the inner core is of a higher molecular weight than the outer sheath.

28. The piece of outdoor furniture of claim 20, wherein the elastomeric yarn is a copolyester.

29. The piece of outdoor furniture of claim 20, wherein the elastomeric yarn has a diameter of about 0.018 to 0.030 inches.

30. The piece of outdoor furniture of claim 20, wherein the fill direction yarn spacing is between 8 to about 20 ends per inch and the warp direction yarn spacing is between 14 to about 50 ends per inch.

31. The piece of outdoor furniture of claim 20, wherein the fill direction yarn contains elastomeric yarn of 14 ends per inch of 0.022 inch co-extruded elastomeric yarn and the vinyl coated multifilament yarn contains 25 ends per inch of 0.018 to 0.025 inch diameter coated 500 to 1000 denier polyester yarn.

32. The piece of outdoor furniture of claim 20, wherein strands of the yarn in the fill direction are arranged over strands of the yarn in the warp direction in an alternating interlocking relationship.

33. The piece of outdoor furniture of claim 20, wherein the yarn in the fill direction and the yarn in the warp direction are bonded at the cross-over points.

34. The piece of outdoor furniture of claim 20, wherein the woven fabric is one of plain, leno, mock leno, satin weave, twill, and basket weave patterns.

35. The piece of outdoor furniture of claim 20, wherein the woven fabric is attached to the frame such that the elastomeric yarn is positioned wherein the woven fabric is attached to the frame such that the elastomeric yarn is positioned longitudinally.

36. The piece of outdoor furniture of claim 20, wherein the woven fabric is attached to the frame such that the elastomeric yarn is positioned wherein the woven fabric is attached to the frame such that the elastomeric yarn is positioned laterally.

37. The piece of outdoor furniture of claim 20, wherein the elastomeric yarn has an outer sheath of co-extruded yarn containing UV and heat stabilizers.

38. A structure for outdoor use comprising:
a frame having a top portion, a bottom portion, a left portion and a right portion;
a woven fabric attached on the left portion and right portion of the frame;
wherein the woven fabric includes an elastomeric yarn in the fill direction and a coated multifilament yarn in the warp direction, and
wherein spacing of the elastomeric yarn is 14 ends per inch of 0.022 inch diameter co-extruded elastomeric yarn and spacing of the coated multifilament yarn is 42 ends per inch of an alternating 18/2 acrylic and a 0.018 inch diameter polyester yarn.

39. The structure of claim 38, wherein the coated multifilament yarn has a polyester core.

40. The structure of claim 39, wherein the coated multifilament yarn is 500 to 1000 denier polyester coated with vinyl to a diameter of between 0.018 to about 0.030 inches.

41. The structure of claim 40, wherein the coated multifilament yarn has a vinyl content of between 50% to about 85%.

42. The structure of claim 38, wherein the woven fabric includes the elastomeric yarn in the fill direction and a blend of the coated multifilament yarn combined with another yarn type in the warp direction.

43. The structure of claim 42, wherein the coated multifilament yarn is combined with a yarn of at least one of acrylic, polyester and nylon.

44. The structure of claim 42, wherein the coated multifilament yarn is combined with 18/2 acrylic or 600 denier texturized polyester yarn.

45. The structure of claim 42, wherein the elastomeric yarn is a co-extruded thermoplastic elastomer with an inner core and an outer sheath.

46. The structure of claim 45, wherein the inner core is of a higher molecular weight than the outer sheath.

47. The structure of claim 38, wherein the elastomeric yarn is a copolyester.

48. The structure of claim 38, wherein the elastomeric yarn has a diameter of about 0.018 to 0.030 inches.

49. The structure of claim 38, wherein strands of the yarn in the fill direction are arranged over strands of the yarn in the warp direction in an alternating interlocking relationship.

50. The structure of claim 38, wherein the yarn in the fill direction and the yarn in the warp direction are bonded at the cross-over points.

51. The structure of claim 38, wherein the woven fabric is at one of plain, leno, mock leno, satin weave, twill, and basket weave patterns.

52. The structure of claim 38, wherein the woven fabric includes an elastomeric yarn in the warp direction and a vinyl coated multifilament yarn in the fill direction.

53. The structure of claim 38, wherein the woven fabric is attached to the frame such that the elastomeric yarn is positioned longitudinally.

54. The structure of claim 38, wherein the woven fabric is attached to the frame such that the elastomeric yarn is positioned laterally.

55. The structure of claim 38, wherein the elastomeric yarn has an outer sheath of co-extruded yarn containing UV and heat stabilizers.

56. A piece of outdoor furniture comprising:
a frame having a top portion, a bottom portion, a left portion and a right portion;
a woven fabric attached on the left portion and right portion of the frame;
wherein the woven fabric includes an elastomeric yarn in the fill direction and a vinyl coated multifilament core yarn in the warp direction, and
wherein spacing of the elastomeric yarn is 14 ends per inch of 0.022 inch diameter co-extruded elastomeric yarn and spacing of the vinyl coated multifilament yarn spacing is 42 ends per inch of an alternating 18/2 acrylic and a 0.018 inch diameter polyester yarn.

57. The piece of outdoor furniture of claim 56, wherein the vinyl coated multifilament yarn has a polyester core.

58. The piece of outdoor furniture of claim 57, wherein the vinyl coated multifilament yarn is 500 to 1000 denier polyester coated with vinyl to a diameter of between 0.018 to about 0.030 inches.

59. The piece of outdoor furniture of claim 58, wherein the vinyl coated multifilament yarn has a vinyl content of between 50% to about 85%.

60. The piece of outdoor furniture of claim 56, wherein the woven fabric includes the elastomeric yarn in the fill direction and a blend of the vinyl coated multifilament yarn combined with another yarn type in the warp direction.

61. The piece of outdoor furniture of claim 60, wherein the vinyl coated multifilament yarn is combined with a yarn of at least one of acrylic, polyester and nylon.

62. The piece of outdoor furniture of claim 60, wherein the vinyl coated multifilament yarn is combined with 18/2 acrylic or 600 denier texturized polyester yarn.

63. The piece of outdoor furniture of claim 56, wherein the elastomeric yarn is a co-extruded thermoplastic elastomer with an inner core and an outer sheath.

64. The piece of outdoor furniture of claim 63, wherein the inner core is of a higher molecular weight than the outer sheath.

65. The piece of outdoor furniture of claim 56, wherein the elastomeric yarn is a copolyester.

66. The piece of outdoor furniture of claim 56, wherein the elastomeric yarn has a diameter of about 0.018 to 0.030 inches.

67. The piece of outdoor furniture of claim 56, wherein strands of the yarn in the fill direction are arranged over strands of the yarn in the warp direction in an alternating interlocking relationship.

68. The piece of outdoor furniture of claim 56, wherein the yarn in the fill direction and the yarn in the warp direction are bonded at the cross-over points.

69. The piece of outdoor furniture of claim 56, wherein the woven fabric is one of plain, leno, mock leno, satin weave, twill, and basket weave patterns.

70. The piece of outdoor furniture of claim 56, wherein the woven fabric is attached to the frame such that the elastomeric yarn is positioned wherein the woven fabric is attached to the frame such that the elastomeric yarn is positioned longitudinally.

71. The piece of outdoor furniture of claim 56, wherein the woven fabric is attached to the frame such that the elastomeric yarn is positioned wherein the woven fabric is attached to the frame such that the elastomeric yarn is positioned laterally.

72. The piece of outdoor furniture of claim 56, wherein the elastomeric yarn has an outer sheath of co-extruded yarn containing UV and heat stabilizers.

* * * * *